United States Patent [19]

Phillips

[11] Patent Number: 5,367,423
[45] Date of Patent: Nov. 22, 1994

[54] INSERTABLE PROTECTIVE DEVICE FOR VCRS

[76] Inventor: Bryant L. Phillips, 69-618 Stafford Pl., Cathedral City, Calif. 92234

[21] Appl. No.: 37,692

[22] Filed: Mar. 24, 1993

Related U.S. Application Data

[63] Continuation-in-part of Ser. No. 766,519, Sep. 27, 1991, abandoned.

[51] Int. Cl.⁵ .............................................. G11B 23/02
[52] U.S. Cl. .................................................... 360/137
[58] Field of Search .................. 360/137, 97.02; 70/14

[56] References Cited

U.S. PATENT DOCUMENTS 4,655,057  4/1987  Derman ................................. 70/14
4,980,785  12/1990  Talmadge ........................ 360/97.02

Primary Examiner—Paul M. Dzierzynski
Assistant Examiner—Richard Hanig
Attorney, Agent, or Firm—John P. Halvonik

[57] ABSTRACT

The invention is a protective member for the cassette receiving chamber of VCRs and audio cassette recorders. The device is insertable into the VCR and may be locked into place by means of a frictional member that engages with the flange located around the cassette access door of the VCR etc. The device prevents the insertion of foreign objects into the cassette receiving chamber of the VCR, etc.

8 Claims, 5 Drawing Sheets

FIG. 5
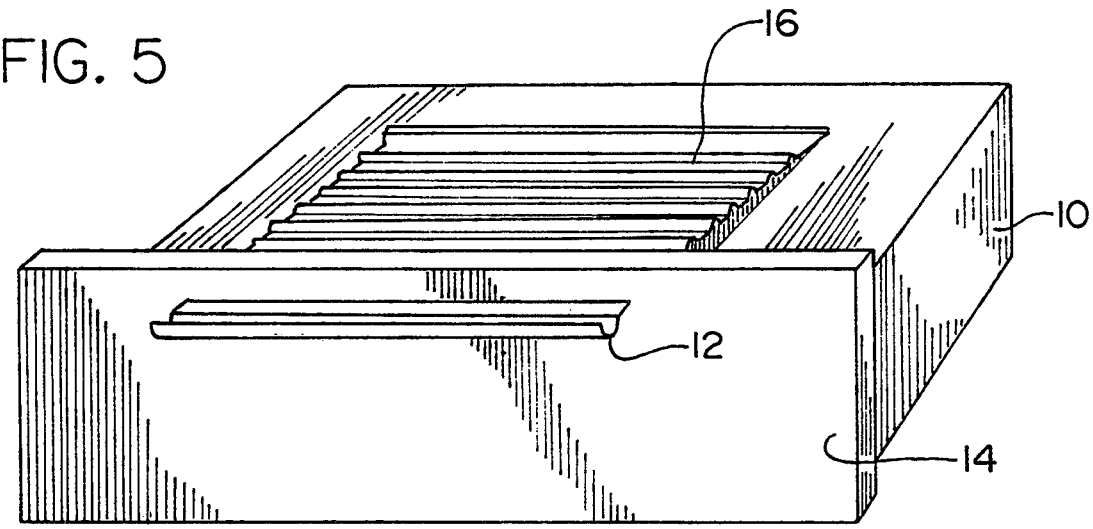
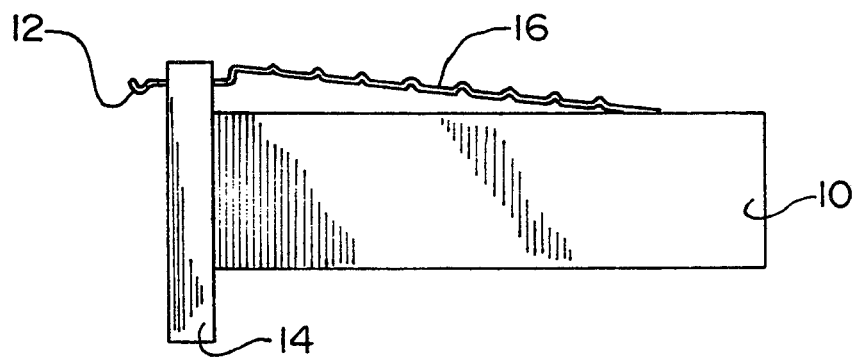
FIG. 5A

INSERTABLE PROTECTIVE DEVICE FOR VCRS

This application is a continuation-in-part of U.S. application 07/766,519, now abandoned.

FIELD OF THE INVENTION

This invention relates to an insertable device used with video and audio cassette recorders and playback machines, specifically to protect the cassette door openings from insertion of injurious foreign objects into the cassette receiving chamber and the inner workings of the machines.

DISCUSSION OF PRIOR ART

Video and Audio Cassette Recorders and playback machines, which are front loading, include a door in the front surface to receive the video or audio cassettes. This opening is commonly protected by a spring-loaded flap. The working mechanism, tape recording heads and electronics are protected by this moveable flap. This door opening is susceptible to receiving foreign objects which can damage the sensitive inner workings, the most common damage results from small children inserting foreign objects into these doors damaging the mechanical, magnetic and electronic components.

The standard door opening on the front loading video cassette recorder and playback machine measures 19.2 cm by 2.9 cm and the cassette is inserted its full width into the carrier mechanism allowing the door to flap up to receive the cassette.

The recording heads which contact the video tape are positioned directly in the back of the video cassette carrier mechanism within the machine. The insertion of foreign objects, e.g. pencils, small toys, waste paper, food causes misalignment and damage of the recording heads, the carrier mechanism, the wiring and electronics depending on the nature of the object and whether it is liquid or solid. A potential safety hazard exists for small children if they accidentally insert a piece of conducting material and manage to touch one of the terminals supplying electric current. Due to the sensitive nature of the working components of video and audio cassette recorders and playback machines, damage usually results in the need for expensive expert repair. In some instances the machines are completely ruined beyond repair and must be discarded or replaced.

The proliferation of video and audio cassette equipment for home and business use has increased the potential and actual incidents of such damage. This problem has not been addressed to the extent of our market and patent research.

Inventors have created several types of enclosures to protect the entire video cassette machine from damage due to transportation from video and rental store to the home and back. These patents are more concerned with protection and permitting restricted operation of the machine through relatively small access openings.

U.S. Pat. No. 4,458,813 Tushinsky, et al. (1984) discloses a housing for a video cassette playback machine. This patent addresses machines with top loading access for video cassettes. While it generally protects the machine, it does not protect against foreign objects into the inner workings.

U.S. Pat. No. 4,855,845 Thrush (1989) shows a video cassette apparatus and method for protecting video cassette recorders from damage by limiting access through tamper resistant elements. This patent is directed to top loading machines provided for the rental video cassette recorder market. While this device provides limited access to certain functions of the machine, it provides no protection for insertion of foreign objects into the top loading carrier mechanism for the video cassette. Both of these devices are related in some way to the video cassette recorder market. Neither of them address the issue of insertion of foreign objects into the cassette access opening.

U.S. Pat. No. 4,725,903 Miley (1988) describes a shield for video and audio cassette recorder door to cover the gap between the door and the top of the recorder to prevent dust from passing through the gap. Miley addresses the issue of thus gaining entry through a small gap around a top loading cassette recorder. The shield elevates up and down with the top loading mechanism and provides no protection for the insertion of foreign objects into the cassette receiving chamber and inner workings of the video cassette recorder.

All of the devices known suffer from a number disadvantages:

a. All of the above direct their attention to top loading video or audio cassette recorders and playback machines; none speak to the protection of the front loading machine, b. the cassette access doors of all of the above are not protected from insertion of foreign objects through any barrier device, c. the dust protection shield only works on top loading machines. It elevates with the dust cover offering no protection from the insertion of foreign objects into the inner workings of the machine, d. none of the above inventions address the problems associated with the insertion of foreign objects into the spring loaded flap covering the front loading access door and cassette receiving chamber for video or audio cassette recording/playback machines.

SUMMARY OF THE INVENTION

The invention is a protective device which is inserted into the cassette access door of the cassette receiving chamber of front-loading VCR and audio cassette machines to prevent damage to the inner-workings through insertion of foreign objects. The article comprises a release handle (12) attached to the face of the door seal flange 14. The flange butts against the area around the cassette door when the article is inserted. Attached to the flange is a rectangular insertion member 10 and a frictional locking member 16 located at the top of the insertion member that engages the edge of the VCR door. The barrier device 8 is made of a flexible material to allow for repeated bending without fracturing allowing for release of the friction locking mechanism by exerting pressure on the handle.

It is an objective of the invention to provide a barrier device which will protect front loading video and audio cassette recorders/playback machines from accidental or intentional insertion of foreign objects into the cassette-receiving chamber resulting in internal damage to the machine.

Another objective of the invention is to provide a barrier device that can engage with current spring loaded flap closures used in front loading VCR and audio recorder/playback machines so that the device can be secured within a VCR.

Yet another objective is to provide an easy to use and economical barrier device preventing the intrusion of foreign objects into the inner workings of video and audio cassette recorders/playback machines.

Still another objective is to provide a barrier device which will be resistant to small children and safe for the machine, while being easy and convenient to use.

Another is to provide a barrier device which is capable of being colored to suit the needs of various VCR and audio cassette recorder/playback machine manufacturers.

Another is to provide an inexpensive and durable barrier device which is interchangeable in different front loading VCR and audio cassette machines.

Further objects and advantages are to provide a barrier device which can be easily manufactured and conveniently marketed to a broad spectrum of users including private individuals, schools, research facilities, and institutions to name a few of the potential application sites.

Other objects and advantages will become apparent from a consideration of the ensuring description and drawings.

BRIEF DESCRIPTION OF THE DRAWINGS

In the drawings, closely related figures have the same number but different alphabetic suffixes.

FIG. 5 shows details of the release handle and flange and a side view of same
FIG. 6 Three quarter view of version with lock rods.

DESCRIPTION OF THE PREFERRED EMBODIMENTS

Figure 6:
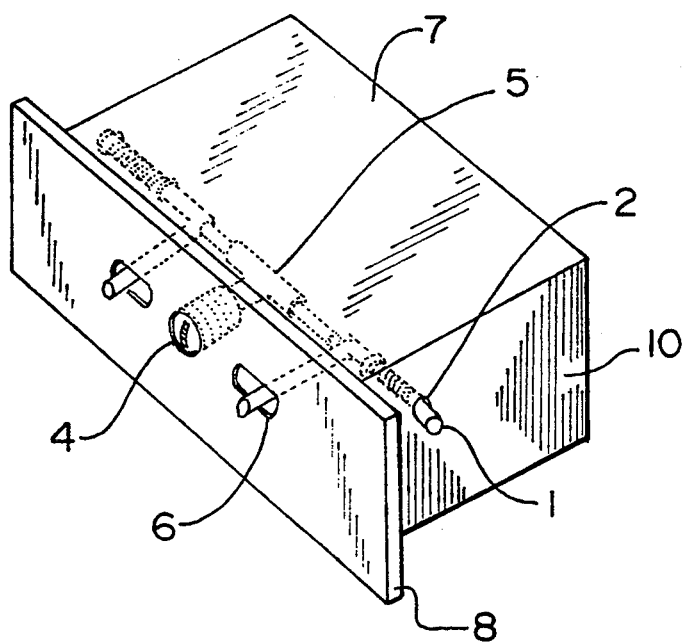
Figure 7:
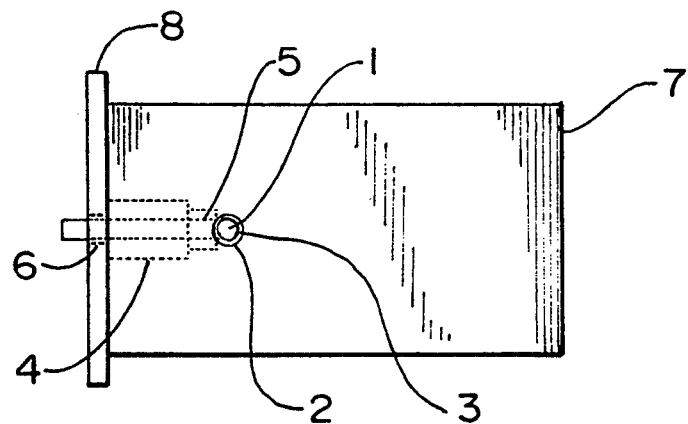
FIG. 7 Top view of version with lock rods.
Figure 8:
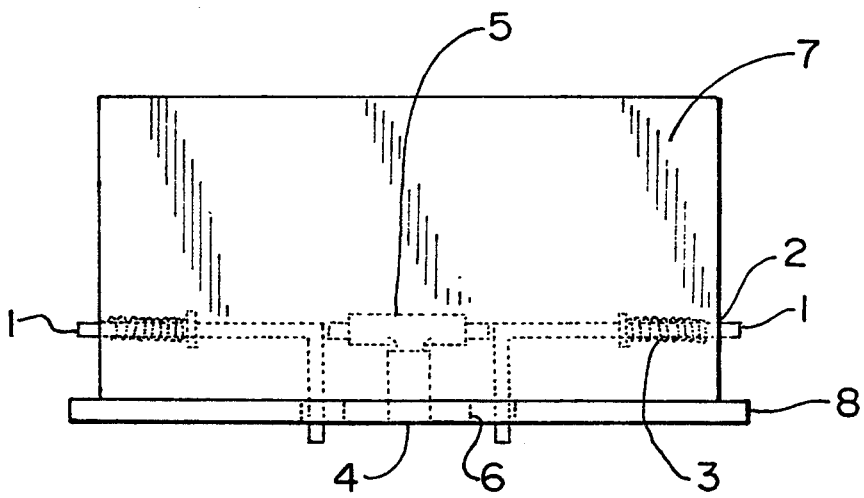
FIG. 8 Another view of version with lock rods.

A version of the device using locking rods that extend from the sides of the inserted member is shown in FIG. 6-8. One end of each of the locking rods I protrude from the sides 10 of the body insertion member. The rods are L shaped and the other end of each protrudes through the front of the door seal flange 8. Lock rod clips 2 provide a guide for the lock rods and springs 3 are located between the clips and the side walls 10 of the insertion device in order to keep the lock rods against the sides of the VCR cavity when the device is used.

Oval holes 6 on the door seal flange provide access to the front of the lock rods which allow one to squeeze the front portions of the rods towards one another against the force of the spring in order to disengage the ends of the lock rods from the interior of the VCR cavity.

Mounted on the door seal flange is a lock tumbler 5. On the back side of the lock tumbler is the lock bar stop 4. The lock bar stop has extended portions which can be rotated (along with the tumbler) in order to prevent the lock rods from moving horizontally when in the locked position.

Figure 9:
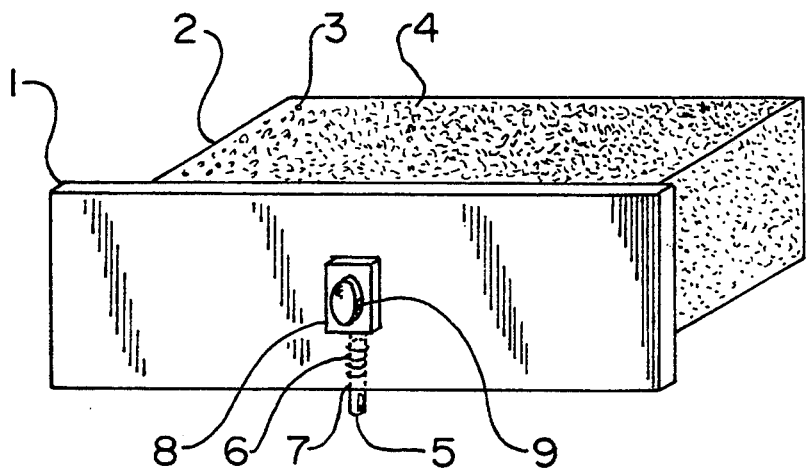
FIG. 9 Front view of moisture proof version.
Figure 10:
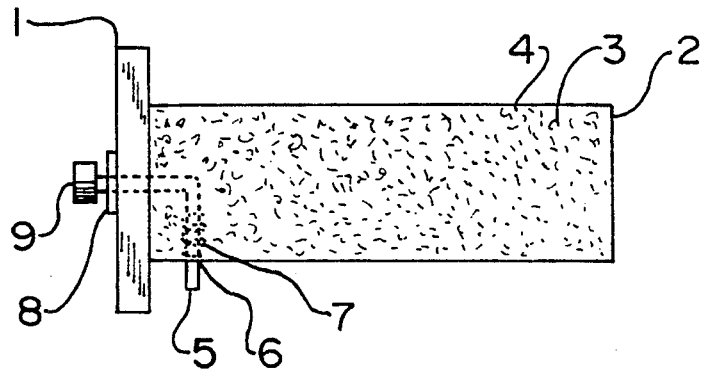
FIG. 10 Side view of moisture proof version.
Figure 11:
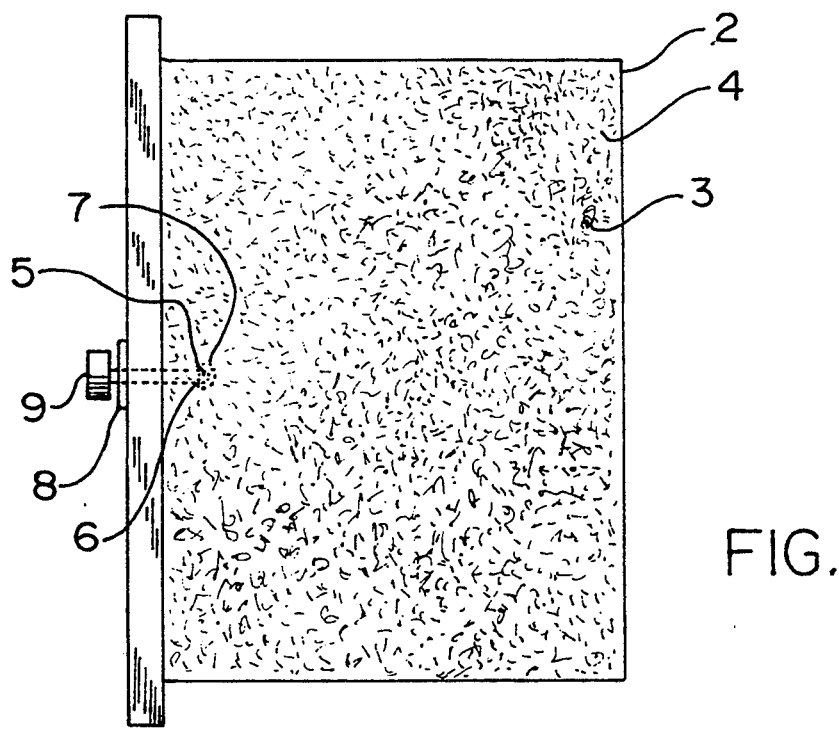
FIG. 11 Top view of moisture proof version.
Reference Numerals in the Drawing
2 Typical VCR machine
4 Front loading VCR access door
6 Spring action door flap
8 Partially inserted invention barrier device
10 Body insertion member
12 Release handle
14 Door seal flange
16 Friction locking mechanism

Another version with a moisture proof barrier is seen in FIG. 9-11. Here the body insertion member 2 has a port 3 for allowing moisture in to the center of the body insertion member. A moisture absorbent material 4 is located on the top of the member 2. The moisture absorbent material draws moisture into the moisture ports. This absorbent material helps to protect VCRs in areas of high humidity.

The locking mechanism comprises a vertical locking pin 5 which protrudes through the bottom of the body insertion member 2. The locking pin is pushed up by handle 9 which unlocks the locking pin. The locking clips 6 holds the locking pin into place through the use of the spring 7. The spring pushes the locking pin back into the closed position. The oval hole 8 allows for vertical movement of the locking pin.

Figure 2:
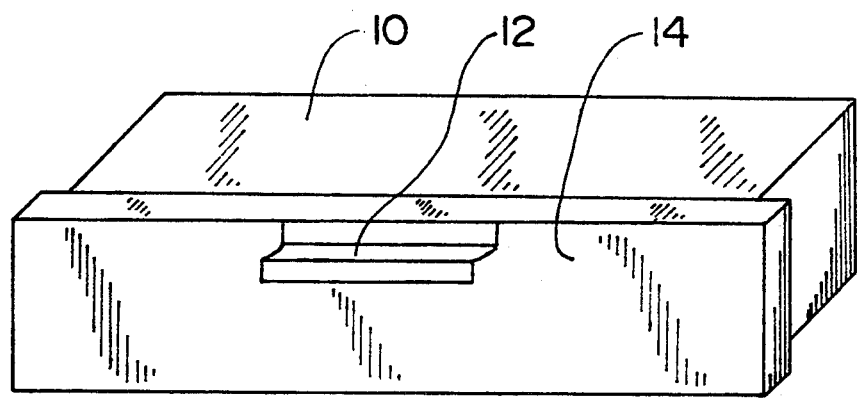
FIG. 2 shows an isometric view of the barrier device.

Throughout the specifications, the term "VCR" will be understood to refer to VCRs as well as audio cassette devices and any other state of the art apparatus that uses a similar opening for the insertion of cassette devices. A typical embodiment of the barrier device is shown in FIG. 2 (front view), FIG. 3 (side view), and FIG. 4 (top view).

In the preferred embodiment, the barrier device is constructed by injection-molding from a flexible plastic. The base may be made from any material that can be repeatedly bent without fracturing, such as polyethylene, polypropylene, vinyl, nylon, rubber, leather, various impregnated or laminated fibrous materials, various plasticized materials, cardboard, paper, wood, etc.

Attached to the handle 12 is the door seal flange which preferably measures 21 cm in length and 4.2 cm in its height 14. The door seal flange exceeds the dimensions of the body insertion member 10 around its perimeter. The flange will effectively seal around the opening in the VCR when the insertion member is inserted into the chamber by butting against the area around the opening.

Figure 3:
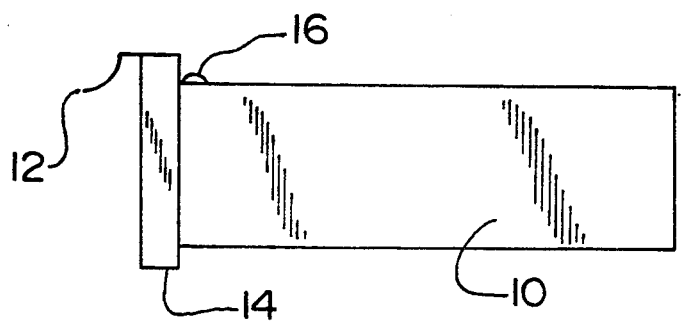
FIG. 3 shows a side view of the barrier device.
Figure 4:
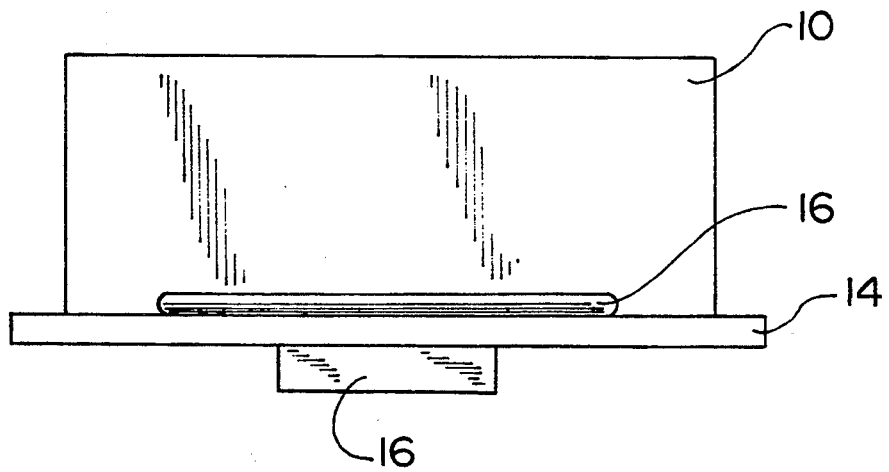
FIG. 4 shows the top view of the barrier device

The body insertion member 10 preferably measures about 18.8 cm in length, 4.3 cm in width, and 2.4 cm in height. The friction locking mechanism 16 is a part of the release handle 12. The friction locking mechanism 16 may be about 8 cm in length and 0.4 cm in height. The release handle 12 mounts on the face of the door seal flange 14 and should be curvilinear and preferably about 4.5 cm in length, 1.5 cm in width, and 1 cm in height. FIG. 3 shows the components described above in side view.

There are various possibilities with regard to the relative disposition of the described components. For example, the friction locking mechanism may take the shape of a wedge or be mechanical in nature to provide positive-locking action for security, these being variations of the basic concept.

While the preferred embodiment is injection molded plastic, the components could be assembled from other materials and fixed to each other by adhesive, screws or other fasteners. For instance, the door seal flange 14 could be screwed or glued to the body insertion member 10.

OPERATION

Figure 1A:
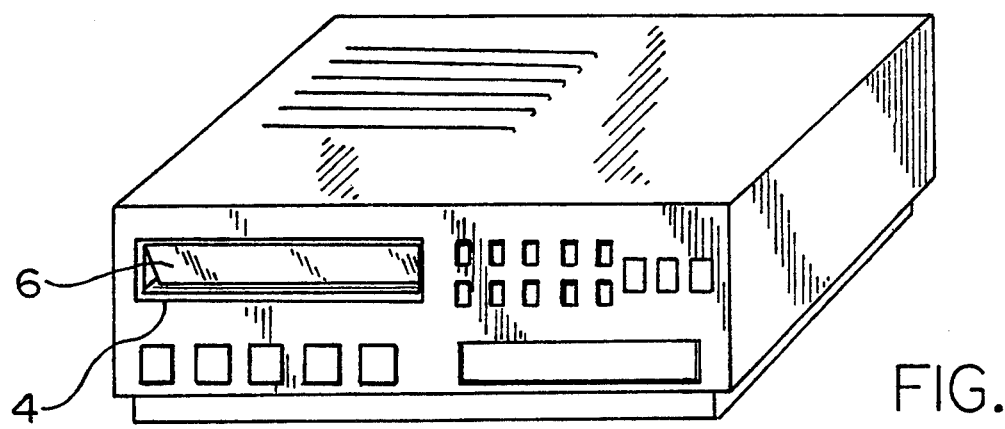
FIG. 1a is an isometric view of a typical front loading video cassette recorder/playback machine.
Figure 1B:
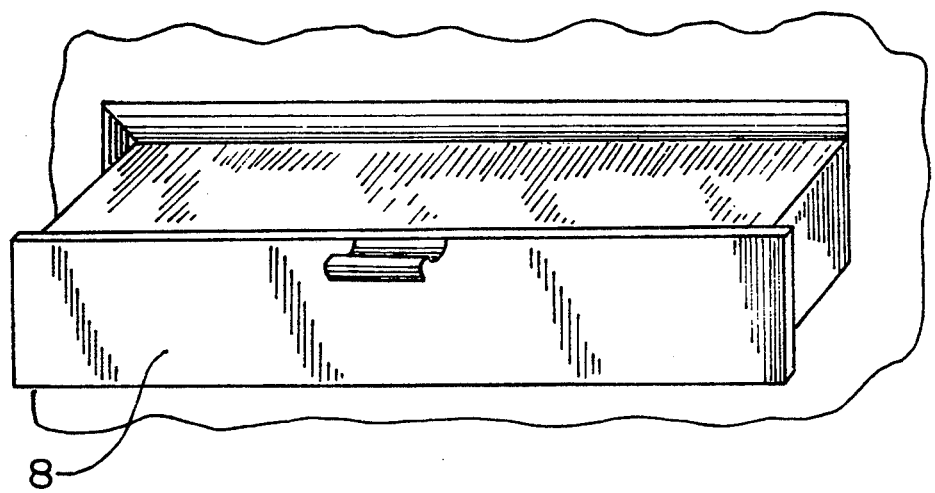
FIG. 1b shows the exploded view of the invention barrier device partially inserted into the front loading cassette door with the door flap partially opened.

The barrier device is grasped by its release handle 12 and then one proceeds to insert the body insertion member 10 into the front-loading cassette door 4, pushing it into the cassette receiving chamber until the friction locking mechanism 16 engages the upper edge of the VCR or audio cassette door opening. The partially inserted barrier device 8 is demonstrated in the exploded view in FIG. 1b.

To remove the barrier device, one grasps the release handle 12 depressing it slightly to disengage the friction locking mechanism 16 by compressing the flexible material of said flange 14. The friction locking mechanism should be able to pivot downward so that the action on the handle will cause it to disengage. This may be accomplished by making the member of plastic or other materials that will give or by some other means. Gently pulling the barrier device forward disengages the body insertion member 10 from the cassette access door returning the spring-action door flap 6 to its original position awaiting the insertion of the video cassette.

The barrier device provides a cost-effective invention to prevent expensive damage from occurring to video and audio cassette machines thereby eliminating ruined machines and expensive repair bills.

From the description above, a number of advantages of the barrier device of the present application will be apparent:

a. The insertable barrier device is economical to manufacture in that injection molding is efficient and inexpensive.

b. The device is easy to understand and provides a readily available protective device for expensive VCR and audio cassette equipment.

c. The insertable barrier device is easily colored in its manufacturing to match various VCR and audio cassette machines.

d. The insertable barrier device provides a deterrent to young children preventing insertion of foreign objects into VCR and audio cassette machines while retaining simplicity of operation for adults.

e. The insertable barrier device may be used for security purposes by adding a positive locking mechanism.

Furthermore, the barrier device has other additional advantages in that:

It permits the production of various colors of devices to accommodate a wide range of manufacturers.

It provides an intuitive device which allows convenient use by adults and deters damage from youngsters.

It provides a device which is not on the market nor present in any of the researched patents.

It allows for a method to control tampering, incidental, accidental or intentional damage to the internal workings of video and audio cassette recorder/playback machines.

It provides a security device for controlling unauthorized utilization.

The barrier device can be made of other materials. It may be glued or screwed together rather than injection molded. A mechanical locking mechanism may be substituted for the friction locking mechanism in the instance of greater security.

I claim:

1. A protective device for insertion into the openings of cassette receiving chambers of VCRs and audio cassette machines so as to prevent the intrusion of foreign objects into said chambers, said receiving chambers being of rectangular construction and having top, bottom and left and right side walls, said protective device comprising: a door seal flange having front and rear surfaces, an insertion member attached to said rear surface, said insertion member having an upper wall and side walls, said insertion member of size for fitting within said cassette receiving chamber so that said side walls of said insertion member will abut said side walls of said receiving chamber when said insertion member is inserted, frictional locking means in connection with said insertion member for frictionally engaging with at least one of said walls of said cassette opening, a releasing means in connection with said door seal flange for disengaging said friction locking means upon being actuated.

2. The apparatus of claim 1 wherein said frictional locking means comprises left and right extension members in connection with said left and right side walls of said insertion member, said extension members adapted for abutting said side walls of said opening.

3. The apparatus of claim 1 wherein said frictional locking means extends from near the front of said upper wall of said insertion member to near the top of said rear surface of said flange member, said locking means having extended portions capable of engaging with the upper edge of said cassette opening.

4. The apparatus of claim 1 wherein said insertion member has a bottom wall and said frictional locking means is in connection with said bottom wall, said frictional locking means for engaging with said bottom wall of said cassette opening.

5. The apparatus of claim 3 wherein said flange is about 21 cm in width and about 4.2 cm in height.

6. The apparatus of claim 5 wherein said body insertion member is about 18.8 cm. in length, about 4.3 cm in width and about 2.4 cm in height.

7. The apparatus of claim 2 wherein said body insertion member is about 18.8 cm. in length, about 4.3 cm in width and about 2.4 cm in height.

8. The apparatus of claim 4 wherein said body insertion member is about 18.8 cm. in length, about 4.3 cm in width and about 2.4 cm in height.

* * * * *